US008892735B2

(12) United States Patent
Garrett

(10) Patent No.: US 8,892,735 B2
(45) Date of Patent: Nov. 18, 2014

(54) PHONE HOME SERVLET IN A COMPUTER INVESTIGATION SYSTEM

(75) Inventor: Matthew Steven Garrett, Whittier, CA (US)

(73) Assignee: Guidance Software, Inc., Pasadena, CA (US)

( * ) Notice: Subject to any disclaimer, the term of this patent is extended or adjusted under 35 U.S.C. 154(b) by 1876 days.

(21) Appl. No.: 11/862,674

(22) Filed: Sep. 27, 2007

(65) Prior Publication Data

US 2008/0082672 A1    Apr. 3, 2008

Related U.S. Application Data

(60) Provisional application No. 60/848,067, filed on Sep. 28, 2006.

(51) Int. Cl.
G06F 15/16  (2006.01)
H04L 29/08  (2006.01)

(52) U.S. Cl.
CPC .............. H04L 67/125 (2013.01); H04L 67/14 (2013.01)
USPC ........................................................ 709/225

(58) Field of Classification Search
CPC ............................ H04L 67/125; H04L 67/14
USPC .................. 709/223–226, 201–203
See application file for complete search history.

(56) References Cited

U.S. PATENT DOCUMENTS

| | | | |
|---|---|---|---|
| 5,475,625 A | 12/1995 | Glaschick | |
| 5,491,750 A | 2/1996 | Bellare et al. | |
| 5,819,273 A | 10/1998 | Vora et al. | |
| 5,928,323 A | 7/1999 | Gosling et al. | |
| 5,944,791 A | 8/1999 | Scherpbier | |
| 5,944,794 A | 8/1999 | Okamoto et al. | |
| 5,991,810 A * | 11/1999 | Shapiro et al. | 709/229 |
| 6,012,098 A | 1/2000 | Bayeh et al. | |
| 6,084,969 A | 7/2000 | Wright et al. | |
| 6,377,589 B1 | 4/2002 | Knight et al. | |
| 6,601,061 B1 | 7/2003 | Holt et al. | |
| 6,647,400 B1 | 11/2003 | Moran | |
| 6,792,545 B2 | 9/2004 | McCreight et al. | |
| 6,874,088 B1 | 3/2005 | Stevens | |
| 6,889,168 B2 | 5/2005 | Hartley et al. | |
| 6,892,225 B1 * | 5/2005 | Tu et al. | 709/217 |
| 6,944,760 B2 | 9/2005 | Wills | |
| 7,096,503 B1 | 8/2006 | Magdych et al. | |
| 7,146,642 B1 | 12/2006 | Magdych et al. | |

(Continued)

OTHER PUBLICATIONS

International Search Report and Written Opinion for PCT/US06/39527, dated Jul. 7, 2008, 8 pgs.

(Continued)

*Primary Examiner* — Thai Nguyen
(74) *Attorney, Agent, or Firm* — Christie, Parker & Hale, LLP

(57) ABSTRACT

A system for conducting forensic investigations is provided which includes a target device, an examining device, and a server. The target device includes a phone home servlet which is configured to periodically transmit to the server a request for connection. The server grants the request for connection if there is an investigation request pending from the examining device for the requesting target device. If no such request is pending, the request is denied. The servlet is programmed with various phone home parameters for determining whether the target device should transmit the request for connection.

29 Claims, 5 Drawing Sheets

(56) References Cited

U.S. PATENT DOCUMENTS

| | | |
|---|---|---|
| 7,370,072 B2 | 5/2008 | Jessen |
| 2001/0011349 A1 | 8/2001 | Garrison |
| 2002/0178162 A1 | 11/2002 | Ulrich et al. |
| 2003/0014669 A1 | 1/2003 | Caceres et al. |
| 2003/0172306 A1 | 9/2003 | Cain et al. |
| 2003/0195984 A1 | 10/2003 | Zisapel et al. |
| 2003/0196123 A1 | 10/2003 | Rowland et al. |
| 2003/0208689 A1 | 11/2003 | Garza |
| 2004/0006588 A1 | 1/2004 | Jessen |
| 2004/0073534 A1 | 4/2004 | Robson |
| 2004/0098359 A1 | 5/2004 | Bayliss et al. |
| 2004/0122908 A1 | 6/2004 | Konopka et al. |
| 2004/0250127 A1* | 12/2004 | Scoredos et al. ............... 713/201 |
| 2004/0260733 A1* | 12/2004 | Adelstein et al. ............. 707/202 |
| 2005/0097366 A1* | 5/2005 | McCreight et al. ........... 713/201 |
| 2005/0268334 A1 | 12/2005 | Hesselink et al. |
| 2006/0101009 A1 | 5/2006 | Weber et al. |
| 2007/0011450 A1 | 1/2007 | McCreight et al. |
| 2007/0112783 A1 | 5/2007 | McCreight et al. |
| 2007/0140253 A1* | 6/2007 | Daigle ....................... 370/395.2 |

OTHER PUBLICATIONS

International Search Report and Written Opinion for PCT/US05/46421, dated Jul. 21, 2008, 11 pgs.

*Honeypot Forensics Part 1: Analyzing the Network*, The Honeynet Files, IEEE Computer Society, IEEE Security & Privacy, Jul./Aug. 2004, pp. 72-78.

Abraham, et al. *Investigative Profiling with Computer Forensic Log Data and Association Rules*, IEEE 2002, pp. 11-18.

International Search Report and Written Opinion for PCT/US 07/79870, dated Sep. 15, 2008, 8 pgs.

Civie, V. et al. Future Technologies from Trends in Computer Forensic Science, IEEE Sep. 1998, Sections II and V, pp. 105-108.

Supplemental European Search Report, dated Sep. 22, 2008, for Application No. EP 03734478.5, in the name of Guidance Software, Inc., 3pgs.

\* cited by examiner

PHONE HOME SERVLET IN A COMPUTER INVESTIGATION SYSTEM

CROSS-REFERENCE TO RELATED APPLICATION(S)

This application claims the benefit of U.S. Application No. 60/848,067, filed on Sep. 28, 2006, the content of which is incorporated herein by reference. This application also contains subject matter that is related to the subject matter in U.S. Pat. No. 6,792,545, the content of which is incorporated herein by reference.

BACKGROUND OF THE INVENTION

U.S. Pat. No. 6,792,545, assigned to the Assignee of the present application, discloses a system and method for performing secure investigations of networked devices over a computer network. The devices to be investigated, however, may or may not be connected to the network when the investigation is to be performed. Accordingly, what is desired is for such devices to periodically indicate their presence to a central server when they are connected to the network.

SUMMARY OF THE INVENTION

According to one embodiment, the present invention is directed to a method for conducting forensic investigations over a data communications network that includes a server, an examining device, and a target device. A request for connection is periodically received from the target device that includes the target device's identification information. A connection is established with the target device in response to the request. A determination is then made, in response to the connection with the target device, whether a request to investigate the target device is pending from the examining device. Data is provided for establishing a secure communication link between the examining device and the target device in response to the determination that the request to investigate is pending, and the examining device may then investigate the target device. In this regard, the examining device is configured to forward an investigation command via the established secure communication link and receive an output from the target device via the secure communication link responsive to the investigation command.

According to another embodiment, the present invention is directed to a server coupled to an examining device and a target device over a data communications network for conducting forensic investigations of the target device. The server device includes a processor and a memory storing program instructions for execution by the processor. The program instructions include periodically receiving from the target device a request for connection, the request including identification information for the target device; establishing connection with the target device in response to the request; determining, in response to the connection with the target device, whether a request to investigate the target device is pending from the examining device; and providing data for establishing a secure communication link between the examining device and the target device in response to the determination that the request to investigate is pending.

According to one embodiment of the invention, the server is configured to deny connection between the examining device and the target device in response to the determination that the request to investigate the target device is not pending.

According to one embodiment of the invention, the determination of whether the request to investigate is pending further includes retrieving an address list and determining whether an address of the target device is included in the address list.

According to one embodiment of the invention, the server is further configured to establish connection with the examining device; receive the request to investigate the target device; store the address of the target device in the address list; and wait for receipt of the request for connection from the target device before establishing the connection with the target device.

According to another embodiment, the present invention is directed to an examining device coupled to a server and a target device over a data communications network for conducting forensic investigations of the target device. The examining device includes a processor and a memory storing program instructions for execution by the processor. The program instructions include establishing a first connection with the server; transmitting to the server a request to investigate the target device, the request including identification information for the target device; waiting for the target device to establish a second connection with the server, the target device being configured to transmit a connection request to the server for establishing the second connection; establishing a secure communication link with the target device in response to the target device establishing the second connection with the server; transmitting an investigation command to the target device via the established secure communication link; and receiving an output from the target device via the secure communication link responsive to the investigation command.

According to one embodiment of the invention, the examining device is further configured to maintain the first connection with the server while waiting for the target device to establish the second connection with the server.

According to one embodiment of the invention, the server is configured to wait for the connection request from the target device before attempting connection with the target device.

According to another embodiment, the present invention is directed to a target device coupled to a server and an examining device over a data communications network for being investigated by the examining device. The target device includes a processor and a memory operably coupled to the processor storing program instructions for execution by the processor. The program instructions include determining whether it is time to connect to the server; determining connection to the data communications network; transmitting a request to connect to the server if it is time to connect to the server and it is connected to the data communications network; and receiving a grant to the request to connect if a request from the examining device to investigate the target device is pending at the server.

According to one embodiment, the target device is further configured to receive a denial to the request to connect if the request to investigate is not pending at the server.

According to one embodiment, the target device is further configured to determine a number of consecutive attempts made to connect to the server without establishing the connection; and transmit the request to connect to the server if the number of consecutive attempts is below a maximum amount.

According to one embodiment, the target device is further configured to determine a number of consecutive times a connection is made with the server without also connecting to an examining device; and transmit the request to connect to the server if the number of consecutive times is below a maximum amount.

According to one embodiment, the target device is further configured to determine a number of times the secure communication link is established between the examining device and the target device; and transmit the request to connect to the server if the number of times is below a maximum amount These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

In general terms, embodiments of the present invention are directed to conducting forensic investigations over a data communications network that includes a server, an examining device, and a target device. The target device includes a phone home servlet which is configured to periodically transmit to the server a request for connection. The server grants the request for connection if there is an investigation request pending from the examining device for the requesting target device. If no such request is pending, the request is denied. The servlet is programmed with various phone home parameters for determining whether the target device should transmit the request for connection.

Figure 1:
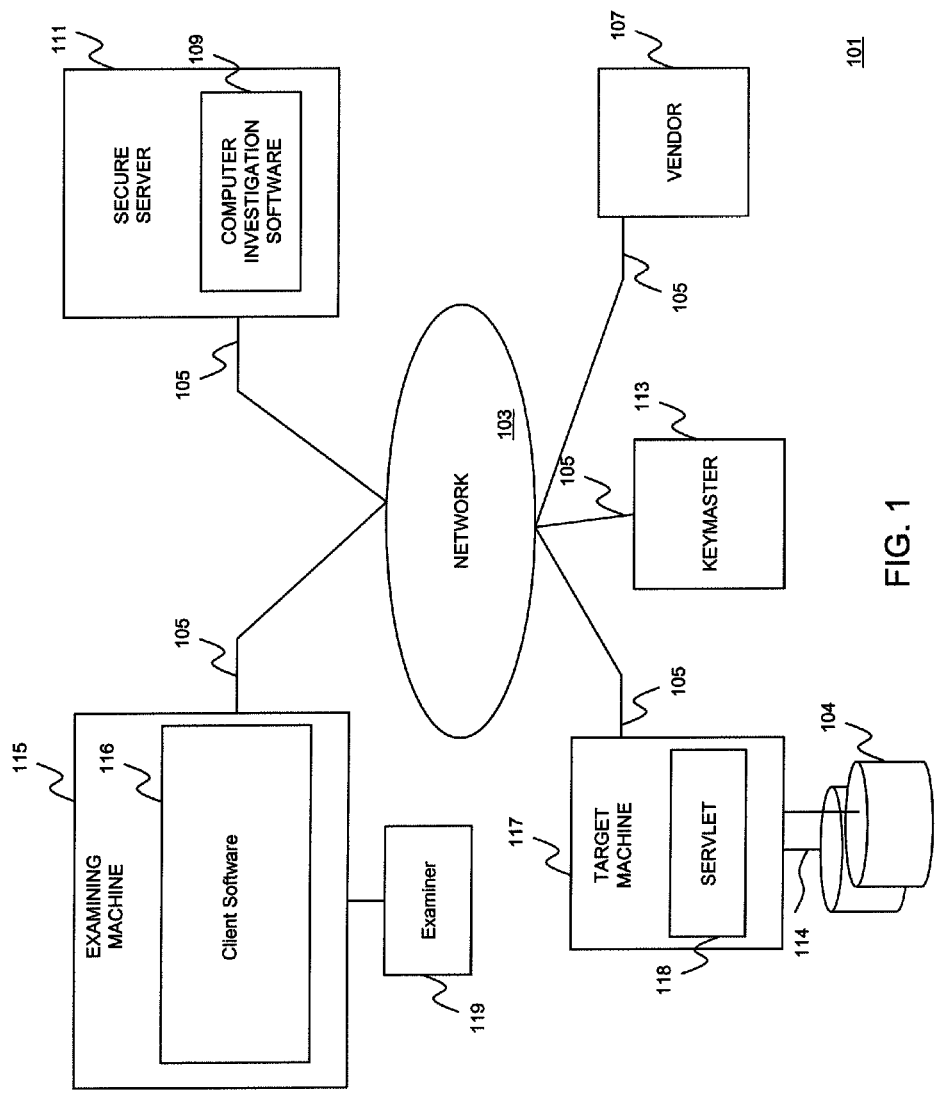
FIG. 1 is a block diagram of an exemplary computer investigation system according to one embodiment of the invention.

FIG. 1 is a block diagram of an exemplary computer investigation system 101 according to one embodiment of the invention. The computer investigation system 101 includes various network devices coupled to a data communications network 103 over data communication links 105. The data communications network 103 may be a computer network, such as, for example, a public Internet, a private wide area network (WAN), a local area network (LAN), or other wired or wireless network environment conventional in the art. The network devices may include a vendor computer 107, a secure server 111, an examining machine 115, one or more target machines 117, and a keymaster computer 113. The data communication link 105 may be any network link conventional in the art, such as, for example, an Ethernet coupling.

A vendor having access to the vendor computer 107 provides the organization with a computer investigation software 109 which enables the organization to effectively perform forensic investigations, respond to network safety alerts, and conduct network audits and other investigations over the data communications network 103.

The investigation software is installed in a local memory of the secure server 111 allocated to the organization. According to one embodiment of the invention, the computer investigation software 109 provides computer program instructions which, when executed by one or more processors resident in the secure server 111, cause the secure server to broker safe communication between the examining machine 115 and the target machines 117. The computer investigation software further facilitates the administration of users, logs transactions conducted via the server, and controls access rights to the system.

The examining machine 115 (which may also be referred to as the client) allows an authorized examiner to conduct searches of the target machines 117 and their associated secondary storage devices 104. In this regard, the examining machine 115 includes a client software 116 which includes the functionality and interoperability for remotely accessing the secure server 111 and corresponding target machines 117. For example, an examiner may access the client software to request investigation of one or more target machines.

Each target machine 117 is exemplarily the subject of a computer investigation conducted by the examining machine 115. The target machine may be a portable device such as, for example, a laptop, personal digital assistant, or any device that may connect and disconnect from the network.

According to one embodiment of the invention, each target machine 117 is coupled to one or more secondary storage devices 104 over an input/output connection 114. The storage devices include any nonvolatile storage media such as, for example, hard disks, diskettes, Zip drives, redundant array of independent disks (RAID) systems, holographic storage devices, and the like.

According to one embodiment, a servlet 118 installed on a particular target machine 117 responds to commands provided by the examining machine 115 to remotely discover, preview, and acquire dynamic and/or static data stored at the target machine and/or the associated secondary storage device(s) 104, and transmit the acquired data to the examining machine via the secure communication path created between the target machine and the examining machine. The servlet may be implemented as any software module conventional in the art, and is not limited to applets in a web browser environment.

According to one embodiment of the invention, the servlet 118 may be configured as a "phone home" servlet. This may be particularly desirable for target machines that are not always connected to the network, such as, for example, laptops. When such a target machine is in fact connected to the network, the phone home servlet makes calls to the secure server 111 on a periodic basis to make its presence known. In response, the secure server 111 determines whether the target machine is one that needs to be investigated, and if so, brokers a safe connection between the target machine and the examining machine seeking the investigation. The servlet continues to identify itself to the secure server 111 at predetermined intervals while the target machine is connected to the network, and as long as the phone home parameters indicate that the identification is appropriate.

The computer investigation system 101 illustrated in FIG. 1 further allows an authorized examiner direct or remote access to the examining machine 115 via an examiner device 119 in any manner conventional in the art. The examiner device 119 may be an input and/or output device coupled to the examining machine 115, such as, for example, a keyboard and/or monitor. The examiner device 119 may alternatively be a personal computer or laptop communicating with the examining device over a wired or wireless communication mechanism. According to one embodiment of the invention, the examiner is a trusted individual who safely stores in the examining machine 115, one or more encryption keys used for authenticating to the secure server 111 and conducting the secure investigation of the target machines 117, as is described in more detail in the above-referenced U.S. Pat. No. 6,792,545.

According to one embodiment of the invention, a particular servlet 118 is programmed as a phone home servlet by the secure server 111 or by the examining machine 115. In this regard, various phone home parameters are set and stored at the servlet 118 to control when and how often the servlet identifies itself to the secure server 111. The phone home parameters are user-configurable via the examining machine 115 or secure server 111. The servlet 118 is also programmed with a set of network (IP) addresses, machine names, and/or URLs that the servlet 118 may use to place the calls to the secure server 111.

According to one embodiment of the invention, the phone home parameters include, but are not limited to: 1) an interval; 2) a number of tries; 3) a number of server denies; 4) a number of examiner connects; 5) a start time; and 6) a reset window.

The interval is a pre-determined time period that elapses before the servlet attempts another call to the secure server 111.

The number of tries is the maximum number of consecutive attempts made by the servlet to connect to the secure server without being able to establishing a connection.

The number of server denies is the maximum number of consecutive times a connection is made with the secure server without also connecting to an examining machine.

The number of examiner connects is the maximum number of times a connection is made with an examining machine.

According to one embodiment of the invention, when the servlet connects to the secure server 111 but the server denies connection to an examining machine, the number of tries is reset to the original number. However, when a connection is made with the examining machine, the number of server denies and tries is reset to their original numbers. The servlet continues to make calls to the secure server 111 to make its presence known until the number of tries, number of server denies, or number of examiner connections that are left, reaches zero.

The phone home parameters are reset to their programmed values after a predetermined amount of time has elapsed. According to one embodiment of the invention, the phone home parameters are reset on a daily basis. The parameters are reset at a time that is randomly selected to occur after the indicated start time, but within the predetermined reset window. This prevents overloading the secure server with identification packets from servlets as would occur in a large network if all the servlets were given the same reset time.

Figure 2:
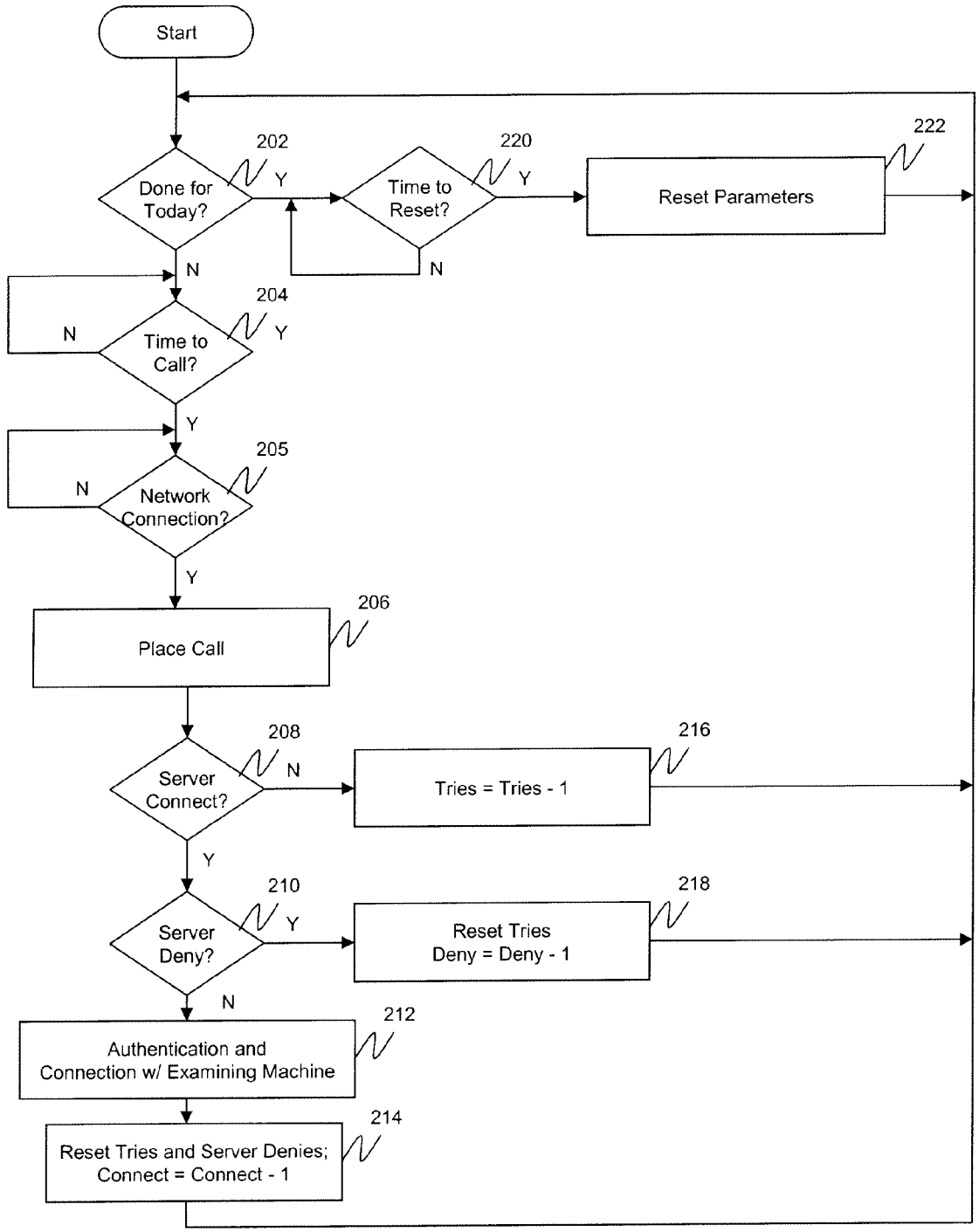
FIG. 2 is a flow diagram of a servlet identification process according to one embodiment of the invention.

FIG. 2 is a flow diagram of a servlet phone home process according to one embodiment of the invention. The process may be a software process implemented via a processor in the target machine according to computer instructions stored in a memory of the target machine. A person of skill in the art should recognize, however, that the process may be implemented, as appropriate, via hardware, firmware, or a combination of hardware, firmware, and/or software In step 202, the servlet determines whether it is finished making calls to the secure server 111 for the day. In this regard, the servlet retrieves its phone home parameters and determines if the allotted number of tries, allotted number of server denies, or allotted number of examiner connects have reached zero. If so, the servlet is done for the day, and waits to reset the parameters for the following day. In this regard, the servlet determines in step 220 if it is time to reset the parameters. If the answer is YES, the phone home parameters are reset in step 222 to their original values, and the calling resumes.

Referring again to step 202, if the servlet determines that it is not done placing calls to the secure server for the day, it determines in step 204 as to whether it is time to place a call. If the answer is YES, the servlet determines in step 205 if a network connection to the data communications network 103 is detected. If a connection is detected, the servlet transmits a request to connect to the server in step 206. In this regard, the servlet makes a call to the particular network address, machine name, or URL stored at the servlet. The call includes the target machine's identification information such as, for example, the target machine's network address, machine name, and domain name. The server therefore if configured, according to this embodiment, to wait for the connection request from the target device before attempting connection with the device. This is desirable when the target device is a portable device, such as, for example, a laptop, which may not be connected to the network at all times.

In step 208, the servlet determines whether a connection is made with the secure server 111. If the answer is YES, a determination is made in step 210 as to whether a server deny message has been received which would deny the servlet connection to an examining machine. If no server denies are received, the servlet engages, in step 212, in an authentication process with the secure server 111 which allows it to establish a full, secure connection with all examining machines 115 waiting to investigate the target machine as is described in further detail below with respect to FIGS. 7A-7B.

Once a connection is made with an examining machine, the servlet resets the number of tries and the number of server denies in step 214. The servlet also decreases by one the total number of allotted examiner connects, and the process returns to step 202 to determine whether it is done for the day.

Referring again to step 208, if no connection is made with the secure server 111, the number of tries is decreased by one in step 216, and the process returns to step 202 to determine whether another connection attempt should be made.

Referring to step 210, if a connection with the secure server is made, but the server transmits a server deny message and no connections are made with an examining machine, the number of tries is reset in step 218. The allotted number of server denies is also decreased by one, and the process returns to step 202.

Figure 3:
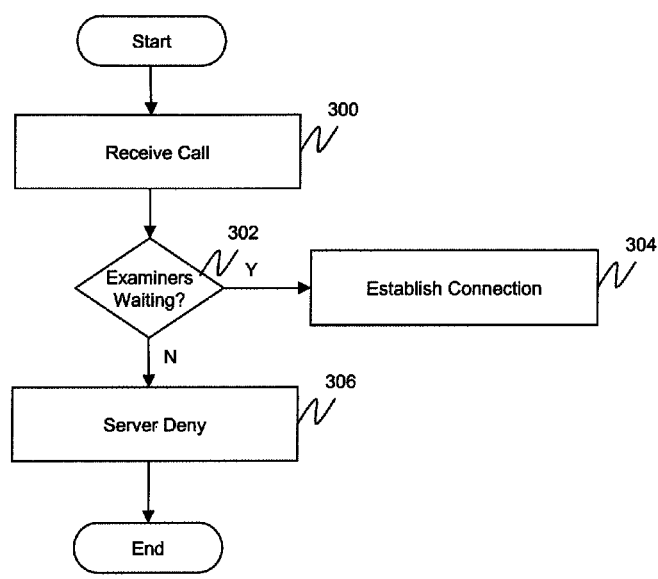
FIG. 3 is a flow diagram of a process executed by a computer investigation software at a secure server for processing calls from the servlets according to one embodiment of the invention.

FIG. 3 is a flow diagram of a process executed by the computer investigation software 109 at the secure server 111 for processing phone home calls from the servlets according to one embodiment of the invention.

In step 300, the secure server receives a call from a particular servlet and establishes a connection with the servlet. The secure server may be configured to concurrently process phone home calls from multiple servlets and establish concurrent connections with those servlets.

In step 302, a determination is made as to whether there are any requests pending from any examining machines to investigate the calling servlet. In this regard, the computer investigation software searches a servlet list and determines whether any of the entries in the list match the network address, machine name, and/or domain name of the calling servlet. If a match is made, the computer investigation software identifies the examining machine which listed the servlet in the servlet list, and engages, in step 304, in an authentication process with the servlet to allow a full, secure connection with the examining machine.

Referring again to step 302, if there are no examining machines waiting for the servlet, the computer investigation software transmits a server deny message in step 306.

Figure 4A:
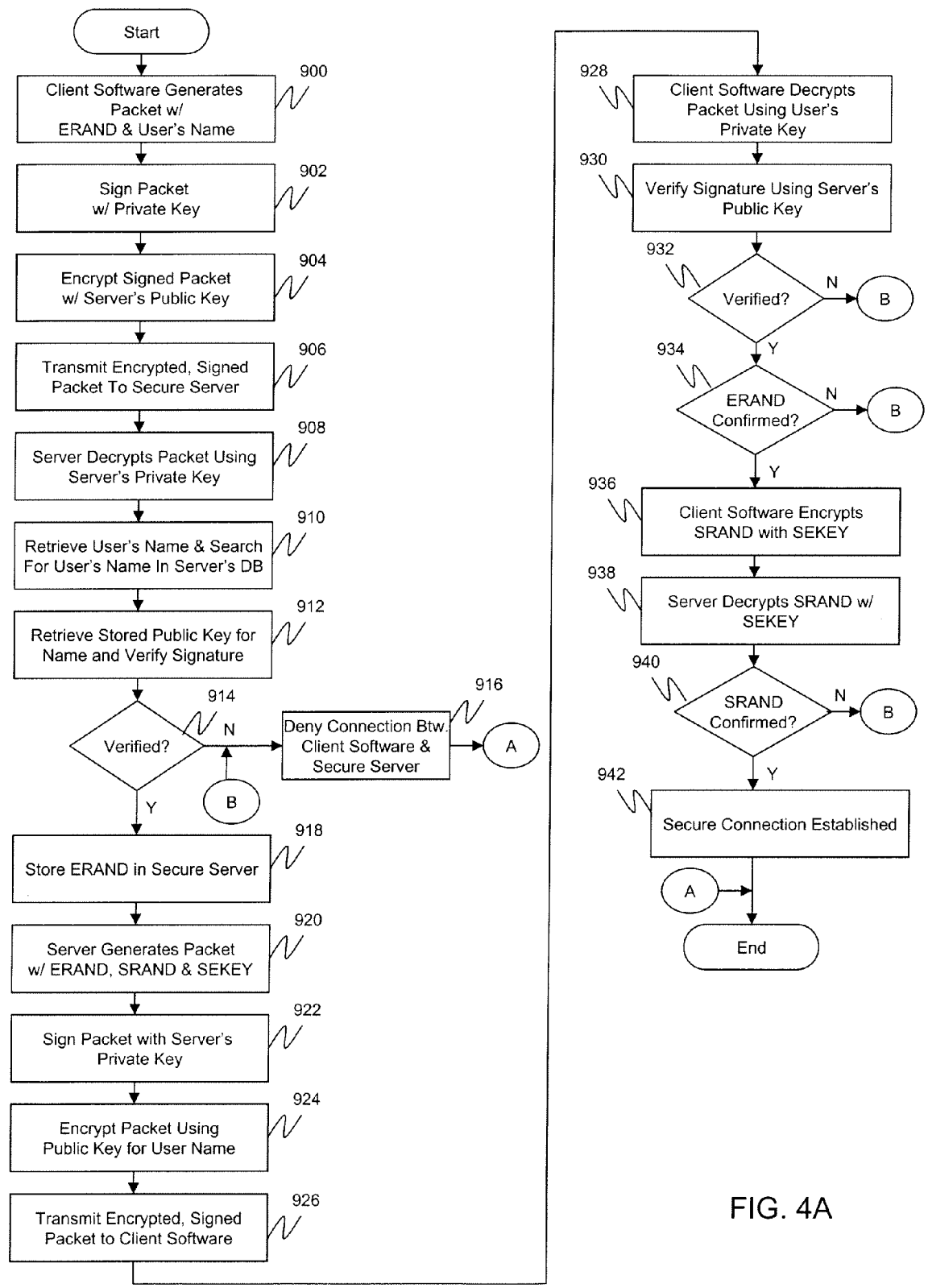
FIG. 4A is a flow diagram of a process for establishing secure communication between an examining machine and a secure server according to one embodiment of the invention.
Figure 4B:
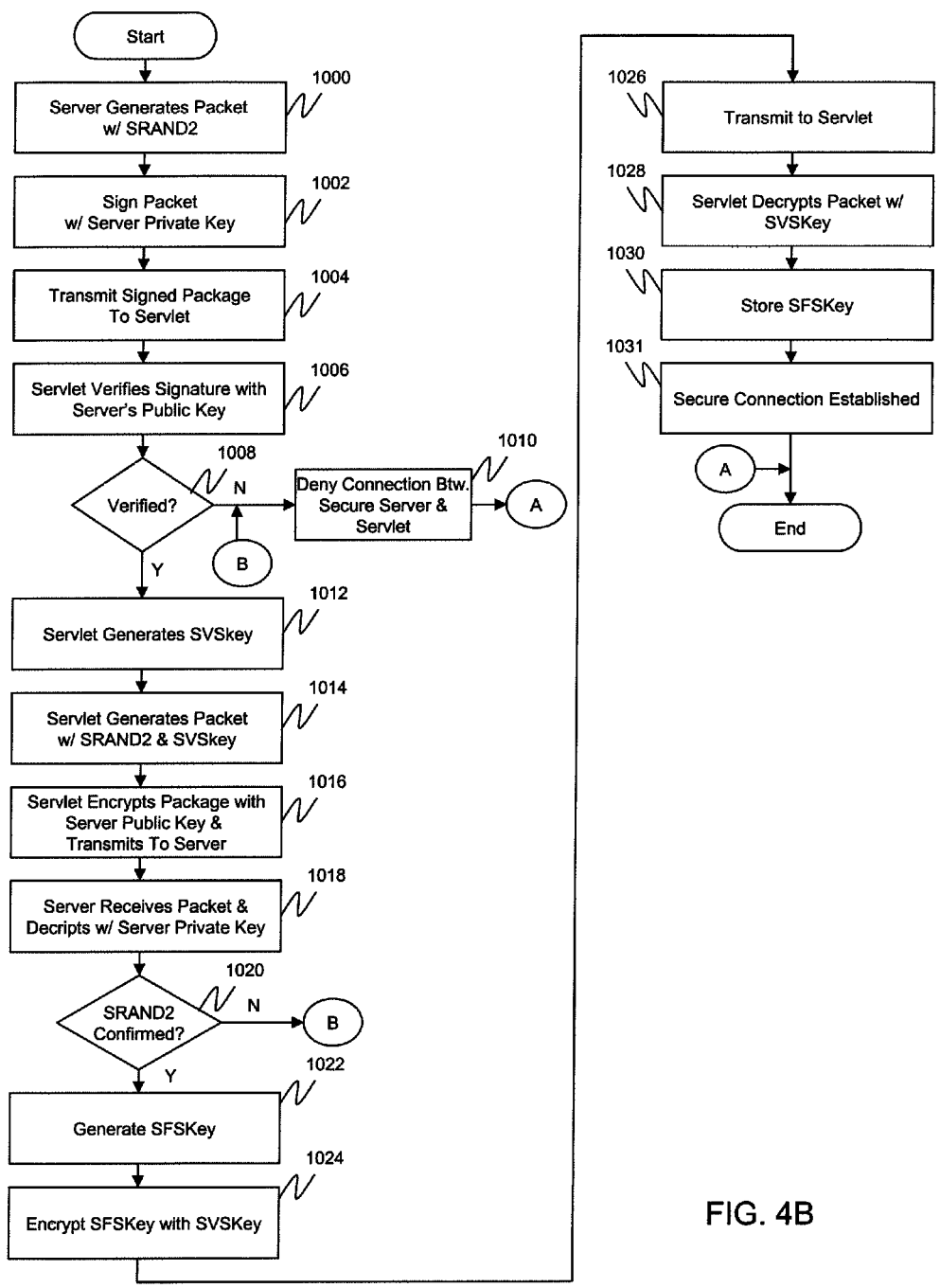
FIG. 4B is a flow diagram of a process for establishing a secure communication between a secure server and a servlet according to one embodiment of the invention.

FIG. 4A is a flow diagram of a process for establishing secure communication between an examining machine 115 and the secure server 111 according to one embodiment of the invention. Once the communication is established, the examining machine may invoke investigations of one or more target machines.

The client software 116 resident in the examining machine 115 is invoked for establishing the secure communication. In general terms, the client software, in step 900, generates an examiner's random number "Erand" and includes it into a packet along with the examiner's user name. In step 902, the client software signs the packet with a user authentication private key as is understood by those of skill in the art. In step 904, the client software encrypts the signed packet with the secure server's public key according to conventional mechanisms, and transmits the encrypted, signed packet to the secure server 111 in step 906.

In step 908, the secure server 111 receives the packet and invokes its computer investigation software 109 to decrypt the packet using the server's private key. In step 910 the software 109 retrieves the examiner's user name from the packet and searches the server's database for a match. The matched name in the server's database includes a public user authentication key which is used in step 912 to verify the user's signature on the packet according to conventional mechanisms. If the signature is not verified, as determined in step 914, the client software cannot be authenticated and a connection between the client software and the secure server is denied in step 916.

If, however, the signature is verified, the client software may be authenticated, and the computer investigation software 109 stores the examiner's random number in step 918. In step 920, the processor generates its own server random number "Srand" and a server-to-examiner session encryption key "SEkey" to be used to encrypt future communications between the server and the examiner. These values, as well as the original examiner's random number are signed with the server's private key in step 922, encrypted with the user's public key in step 924, and transmitted to the client software in step 926.

In step 928, the client software 116 receives the packet from the secure server and decrypts it using the user's private key. In step 930, the client software verifies the server's signature with the server's public key according to conventional mechanisms. In step 932, a determination is made as to whether the signature may be verified. If the answer is YES, the server is authenticated, and the client software verifies the examiner's random number that is transmitted by the server to confirm that it is, in fact, the same number that was sent to the server. If the number may be confirmed, as is determined in step 934, the examiner creates another packet to send back to the server 111. This packet includes the server random number which is encrypted, in step 936, with the server-to-examiner session key. The encrypted packet is then transmitted to the server.

In step 938, the server's computer investigation software 109 decrypts the packet containing the server random number with the server-to-examiner session key. If the received server random number is the same number originally generated and sent to the client software as is determined in step 940, the number is confirmed, and a secure connection is established in step 942. The process for establishing a secure connection between the client software and the secure server 111 is described in more detail in the above-referenced U.S. Pat. No. 6,792,545.

Once a secure connection is established, an examiner may use its client software 116 to request investigation of the target machines across the network in support of incident response, information auditing, and forensic discovery. According to one embodiment of the invention, if a single target machine is identified for doing an investigation, the secure server 111 attempts connection with the single target machine instead of waiting for the target machine to initiate the call. However, if the examiner provides a range of network addresses, the secure server 111 inserts the network addresses into the servlet list and automatically goes into a waiting mode for the servlets to initiate the call.

The secure communication between the examining machine and secure server is established and maintained until the servlet desired to be examined is available for a connection. A person of skill in the art should recognize that multiple connections may be maintained with multiple examining machines who may be waiting for the same servlet. The secure server 111 authorizes and securely brokers requests and communications from each examining machine to the desired target machine. The communication between the server and the client software is encrypted using the server-to-examiner session encryption key.

FIG. 7B is a flow diagram of a process for establishing a secure communication between the secure server 111 and the servlet 118 according to one embodiment of the invention. A number of such secure communications may be established concurrently.

In step 1000, the server's computer investigation software 109 generates a second server random number "Srand2," and signs the packet with the server's private key in step 1002. In step 1004, the software 109 transmits the signed packet to the servlet.

The servlet receives the packet signed with the second server random number, and in step 1006, verifies the signature with the server's public key. If the signature cannot be verified, as is determined in step 1008, a safe connection between the secure server 111 and the servlet 118 is denied in step 1010.

If, however, the server's signature is verified, the servlet generates a servlet-to-server session encryption key in step 1012 and inserts it into a packet in step 1014 along with the second server random number. The servlet encrypts the packet in step 1016 with the server's public key, and transmits the packet to the server 111.

In step 1018, the server's computer investigation software 109 receives the encrypted packet and decrypts it with the server's private key. The processor further confirms in step 1020, whether the second server random number is the same number that was originally sent to the servlet. If the answer is YES, the processor generates a server-to-servlet session encryption key in step 1022, and encrypts the server-to-servlet session encryption key with the servlet-to-server session encryption key in step 1024. In step 1026, the encrypted packet is transmitted to the servlet.

In step 1028, the servlet decrypts the packet with the servlet-to-server session key, and stores the server-to-servlet session key in step 1030. In step 1031, a secure connection is established, and all subsequent data exchanges between the server and the servlet are encrypted using the server-to-servlet session key. The establishment of a secure connection between the secure server 111 and the servlet 118 is described in more detail in the above-referenced U.S. Pat. No. 6,792,545.

Once the server 111 has successfully established secure connections with the examining machine 115 and one or more servlets, the examining machine 115 and the servlets may communicate directly in effectuating searches of dynamic and/or static data stored in the target devices.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. In a data communications network including a server, an examining device, and a target device, a method for conducting forensic investigations of the target device over the data communications network, the method comprising:
   periodically receiving, by the server, from the target device, a request for connection, the request including identification information for the target device;
   establishing connection, by the server, with the target device, in response to the request;
   comparing, by the server, in response to establishing the connection with the target device, the identification information received from the target device with stored identification information for determining whether a request to investigate the target device is pending from the examining device; and
   providing data, by the server, for establishing a secure communication link between the examining device and the target device in response to a match of the identification information received from the target device with the stored identification information, the examining device being configured to receive an output from the target device via the secure communication link,
   wherein the request for connection is transmitted by the target device if the target device has not satisfied a maximum number of consecutive attempts to connect to the server without establishing the connection, and
   the request for connection is transmitted by the target device if the target device has not satisfied a maximum number of consecutive times a connection is made with the server without also connecting to the examining device.

2. The method of claim 1 further comprising:
   denying connection between the examining device and the target device in response to the determination that the request to investigate the target device is not pending.

3. The method of claim 1, wherein the determining whether the request to investigate is pending includes:
   retrieving an address list and determining whether an address of the target device is included in the address list.

4. The method of claim 3 further comprising:
   establishing connection with the examining device;
   receiving the request to investigate the target device;
   storing the address of the target device in the address list; and
   waiting for receipt of the request for connection from the target device before establishing the connection with the target device.

5. The method of claim 1, wherein the request for connection is transmitted by the target device if the target device has not satisfied a maximum number of times the secure communication link is established between the examining device and the target device.

6. The method of claim 1, wherein the output includes data stored in the target device, wherein the data is output in response to a request by the examining device.

7. The method of claim 1, wherein the computer device is the server, and the server is coupled to the target device.

8. The method of claim 1, wherein the request for connection is automatically provided by the target device based on a preset schedule.

9. A server coupled to an examining device and a target device over a data communications network for conducting forensic investigations of the target device, the server comprising:
   a processor; and
   a memory operably coupled to the processor and storing program instructions therein, the processor being operable to execute the program instructions, the program instructions including:
      periodically receiving from the target device a request for connection, the request including identification information for the target device;
      establishing connection with the target device in response to the request;
      comparing, in response to establishing the connection with the target device, the identification information received from the target device with stored identification information for determining whether a request to investigate the target device is pending from the examining device; and
      providing data for establishing a secure communication link between the examining device and the target device in response to a match of the identification information received from the target device with the stored identification information, the examining device being configured to receive an output from the target device via the secure communication link,
   wherein the target device is configured to transmit the request for connection if the target device has not satisfied a maximum number of consecutive attempts to connect to the server without establishing the connection, and
   the target device is configured to transmit the request for connection if the target device has not satisfied a maximum number of consecutive times a connection is made with the server without also connecting to the examining device.

10. The server of claim 9, wherein the program instructions further include:
    denying connection between the examining device and the target device in response to the determination that the request to investigate the target device is not pending.

11. The server of claim 9, wherein the program instructions that determine whether the request to investigate is pending further includes program instructions that:
    retrieve an address list and determine whether an address of the target device is included in the address list.

12. The server of claim 11, wherein the program instructions further include:
    establishing connection with the examining device;
    receiving the request to investigate the target device;
    storing the address of the target device in the address list; and waiting for receipt of the request for connection from the target device before establishing the connection with the target device.

13. An examining device coupled to a server and a target device over a data communications network for conducting forensic investigations of the target device, the examining device comprising:
a processor; and
a memory operably coupled to the processor and storing program instructions therein, the processor being operable to execute the program instructions, the program instructions including:
establishing a first connection with the server;
transmitting to the server a request to investigate the target device, the request including identification information for the target device;
waiting for the target device to establish a second connection with the server, the target device being configured to transmit a connection request to the server for establishing the second connection, the connection request for the second connection including identification information for the target device;
establishing a secure communication link with the target device in response to the target device establishing the second connection with the server, and in response to the server comparing the identification information provided by the target device with the identification information provided by the examining device and determining that a request to investigate the target device is pending from the examining device; and
receiving an output from the target device via the secure communication link responsive to the investigation command,
wherein the target device is configured to transmit the connection request if the target device has not satisfied a maximum number of consecutive attempts to connect to the server without establishing the connection, and
the target device is configured to transmit the connection request if the target device has not satisfied a maximum number of consecutive times a connection is made with the server without also connecting to the examining device.

14. The examining device of claim 13, wherein the program instructions further include:
maintaining the first connection with the server while waiting for the target device to establish the second connection with the server.

15. The examining device of claim 13, wherein the server is configured to wait for the connection request from the target device before attempting connection with the target device.

16. A target device coupled to a server and an examining device over a data communications network for being investigated by the examining device, the target device comprising:
a processor; and
a memory operably coupled to the processor and storing program instructions therein, the processor being operable to execute the program instructions, the program instructions including:
determining whether it is time to connect to the server;
determining connection to the data communications network;
transmitting a request to connect to the server if it is time to connect to the server and it is connected to the data communications network, wherein the request includes identification information for the target device;
receiving a grant to the request to connect;
receiving from the server, data for establishing a secure communication link with the examining device, wherein the server provides the data in response to a match by the server of the identification information received from the target device with stored identification information and determining that a request to investigate the target device is pending from the examining device; and
transmitting an output to the examining device over the secure communication link,
wherein the target device is configured to transmit the request to connect if the target device has not satisfied a maximum number of consecutive attempts to connect to the server without establishing the connection, and
the target device is configured to transmit the request to connect if the target device has not satisfied a maximum number of consecutive times a connection is made with the server without also connecting to the examining device.

17. The target device of claim 16, wherein the program instructions further include:
receiving from the server a denial message indicating denial of a connection with the examining device if the request to investigate is not pending at the server.

18. The target device of claim 16, wherein the program instructions further include:
determining a number of consecutive attempts made to connect to the server without establishing the connection; and
transmitting the request to connect to the server if the number of consecutive attempts is below a maximum amount.

19. The target device of claim 16, wherein the program instructions further include:
determining a number of consecutive times a connection is made with the server without also connecting to an examining device; and
transmitting the request to connect to the server if the number of consecutive times is below a maximum amount.

20. The target device of claim 16, wherein the program instructions further include:
determining a number of times the secure communication link is established between the examining device and the target device; and
transmitting the request to connect to the server if the number of times is below a maximum amount.

21. In a data communications network including a server, an examining device, and a target device, a method for conducting forensic investigations of the target device over the data communications network, the method comprising:
periodically receiving, by the server, from the target device, a request for connection, the request including identification information for the target device;
establishing connection, by the server, with the target device, in response to the request;
comparing, by the server, in response to establishing the connection with the target device, the identification information received from the target device with stored identification information for determining whether a request to investigate the target device is pending from the examining device; and
providing data, by the server, for establishing a secure communication link between the examining device and the target device in response to a match of the identification information received from the target device with the stored identification information, the examining device being configured to receive an output from the target device via the secure communication link, wherein the request for connection depends on a number of unsuccessful attempts to connect with the server, a number of successful connections between the examining device and the target device, and a number of denials of a connection between the examining device and the target device.

22. In a data communications network including a server, an examining device, and a target device, a method for conducting forensic investigations of the target device over the data communications network, the method comprising:

periodically receiving, by the server, from the target device, a request for connection, the request including identification information for the target device;

establishing connection, by the server, with the target device, in response to the request;

comparing, by the server, in response to establishing the connection with the target device, the identification information received from the target device with stored identification information for determining whether a request to investigate the target device is pending from the examining device; and providing data, by the server, for establishing a secure communication link between the examining device and the target device in response to a match of the identification information received from the target device with the stored identification information, the examining device being configured to receive an output from the target device via the secure communication link, wherein the request for connection is transmitted by the target device if the target device has not satisfied a maximum number of consecutive attempts to connect to the server without establishing the connection, and the request for connection is transmitted by the target device if the target device has not satisfied a maximum number of times the secure communication link is established between the examining device and the target device.

23. In a data communications network including a server, an examining device, and a target device, a method for conducting forensic investigations of the target device over the data communications network, the method comprising:

periodically receiving, by the server, from the target device, a request for connection, the request including identification information for the target device;

establishing connection, by the server, with the target device, in response to the request;

comparing, by the server, in response to establishing the connection with the target device, the identification information received from the target device with stored identification information for determining whether a request to investigate the target device is pending from the examining device; and providing data, by the server, for establishing a secure communication link between the examining device and the target device in response to a match of the identification information received from the target device with the stored identification information, the examining device being configured to receive an output from the target device via the secure communication link, wherein the request for connection is transmitted by the target device if the target device has not satisfied a maximum number of consecutive times a connection is made with the server without also connecting to the examining device, and the request for connection is transmitted by the target device if the target device has not satisfied a maximum number of times the secure communication link is established between the examining device and the target device.

24. A server coupled to an examining device and a target device over a data communications network for conducting forensic investigations of the target device, the server comprising:

a processor; and a memory operably coupled to the processor and storing program instructions therein, the processor being operable to execute the program instructions, the program instructions including:

periodically receiving from the target device a request for connection, the request including identification information for the target device;

establishing connection with the target device in response to the request;

comparing, in response to establishing the connection with the target device, the identification information received from the target device with stored identification information for determining whether a request to investigate the target device is pending from the examining device; and providing data for establishing a secure communication link between the examining device and the target device in response to a match of the identification information received from the target device with the stored identification information, the examining device being configured to receive an output from the target device via the secure communication link, wherein the target device is configured to transmit the request for connection if the target device has not satisfied a maximum number of consecutive attempts to connect to the server without establishing the connection, and the target device is configured to transmit the request for connection if the target device has not satisfied a maximum number of times the secure communication link is established between the examining device and the target device.

25. A server coupled to an examining device and a target device over a data communications network for conducting forensic investigations of the target device, the server comprising:

a processor; and a memory operably coupled to the processor and storing program instructions therein, the processor being operable to execute the program instructions, the program instructions including:

periodically receiving from the target device a request for connection, the request including identification information for the target device;

establishing connection with the target device in response to the request;

comparing, in response to establishing the connection with the target device, the identification information received from the target device with stored identification information for determining whether a request to investigate the target device is pending from the examining device; and providing data for establishing a secure communication link between the examining device and the target device in response to a match of the identification information received from the target device with the stored identification information, the examining device being configured to receive an output from the target device via the secure communication link, wherein the target device is configured to transmit the request for connection if the target device has not satisfied a maximum number of consecutive times a connection is made with the server without also connecting to the examining device, and the target device is configured to transmit the request for connection if the target device has not satisfied a maximum number of times the secure communication link is established between the examining device and the target device.

26. An examining device coupled to a server and a target device over a data communications network for conducting forensic investigations of the target device, the examining device comprising:

a processor; and a memory operably coupled to the processor and storing program instructions therein, the processor being operable to execute the program instructions, the program instructions including:

establishing a first connection with the server;

transmitting to the server a request to investigate the target device, the request including identification information for the target device;

waiting for the target device to establish a second connection with the server, the target device being configured to transmit a connection request to the server for establishing the second connection, the connection request for the second connection including identification information for the target device;

establishing a secure communication link with the target device in response to the target device establishing the second connection with the server, and in response to the server comparing the identification information provided by the target device with the identification information provided by the examining device and determining that a request to investigate the target device is pending from the examining device; and receiving an output from the target device via the secure communication link responsive to the investigation command, wherein the target device is configured to transmit the connection request if the target device has not satisfied a maximum number of consecutive attempts to connect to the server without establishing the connection, and the target device is configured to transmit the connection request if the target device has not satisfied a maximum number of times the secure communication link is established between the examining device and the target device.

27. An examining device coupled to a server and a target device over a data communications network for conducting forensic investigations of the target device, the examining device comprising:

a processor; and a memory operably coupled to the processor and storing program instructions therein, the processor being operable to execute the program instructions, the program instructions including:

establishing a first connection with the server;

transmitting to the server a request to investigate the target device, the request including identification information for the target device;

waiting for the target device to establish a second connection with the server, the target device being configured to transmit a connection request to the server for establishing the second connection, the connection request for the second connection including identification information for the target device;

establishing a secure communication link with the target device in response to the target device establishing the second connection with the server, and in response to the server comparing the identification information provided by the target device with the identification information provided by the examining device and determining that a request to investigate the target device is pending from the examining device; and receiving an output from the target device via the secure communication link responsive to the investigation command, wherein the target device is configured to transmit the connection request if the target device has not satisfied a maximum number of consecutive times a connection is made with the server without also connecting to the examining device, and the target device is configured to transmit the connection request if the target device has not satisfied a maximum number of times the secure communication link is established between the examining device and the target device.

28. A target device coupled to a server and an examining device over a data communications network for being investigated by the examining device, the target device comprising:

a processor; and a memory operably coupled to the processor and storing program instructions therein, the processor being operable to execute the program instructions, the program instructions including:

determining whether it is time to connect to the server;

determining connection to the data communications network;

transmitting a request to connect to the server if it is time to connect to the server and it is connected to the data communications network, wherein the request includes identification information for the target device;

receiving a grant to the request to connect;

receiving from the server, data for establishing a secure communication link with the examining device, wherein the server provides the data in response to a match by the server of the identification information received from the target device with stored identification information and determining that a request to investigate the target device is pending from the examining device; and transmitting an output to the examining device over the secure communication link, wherein the target device is configured to transmit the request to connect if the target device has not satisfied a maximum number of consecutive attempts to connect to the server without establishing the connection, and the target device is configured to transmit the request to connect if the target device has not satisfied a maximum number of times the secure communication link is established between the examining device and the target device.

29. A target device coupled to a server and an examining device over a data communications network for being investigated by the examining device, the target device comprising:

a processor; and a memory operably coupled to the processor and storing program instructions therein, the processor being operable to execute the program instructions, the program instructions including:
  determining whether it is time to connect to the server;
  determining connection to the data communications network;
  transmitting a request to connect to the server if it is time to connect to the server and it is connected to the data communications network, wherein the request includes identification information for the target device;
  receiving a grant to the request to connect;
  receiving from the server, data for establishing a secure communication link with the examining device, wherein the server provides the data in response to a match by the server of the identification information received from the target device with stored identification information and determining that a request to investigate the target device is pending from the examining device; and
  transmitting an output to the examining device over the secure communication link,
wherein the target device is configured to transmit the request to connect if the target device has not satisfied a maximum number of consecutive times a connection is made with the server without also connecting to the examining device, and
the target device is configured to transmit the request to connect if the target device has not satisfied a maximum number of times the secure communication link is established between the examining device and the target device.

* * * * *